Dec. 24, 1957   R. B. JACOBS ET AL   2,817,764
BETA RAY HYDROGEN DENSITY INDICATOR
Filed April 29, 1955   4 Sheets-Sheet 1

INVENTORS:
Robert B. Jacobs
Evon C. Greanias
BY Everett A. Johnson
ATTORNEY

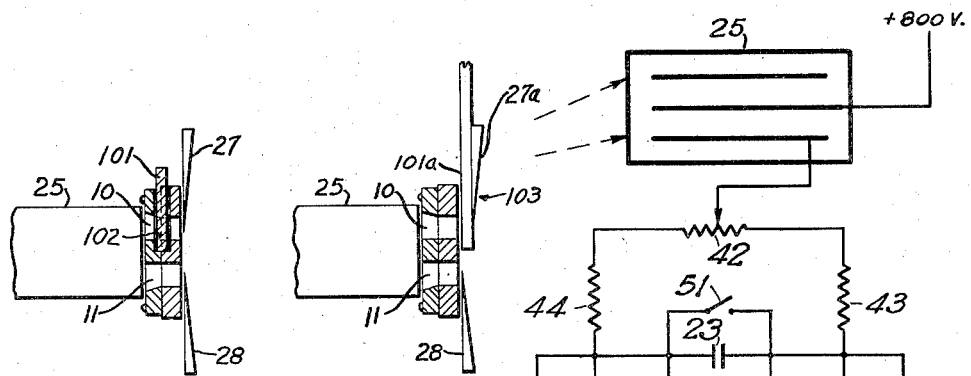
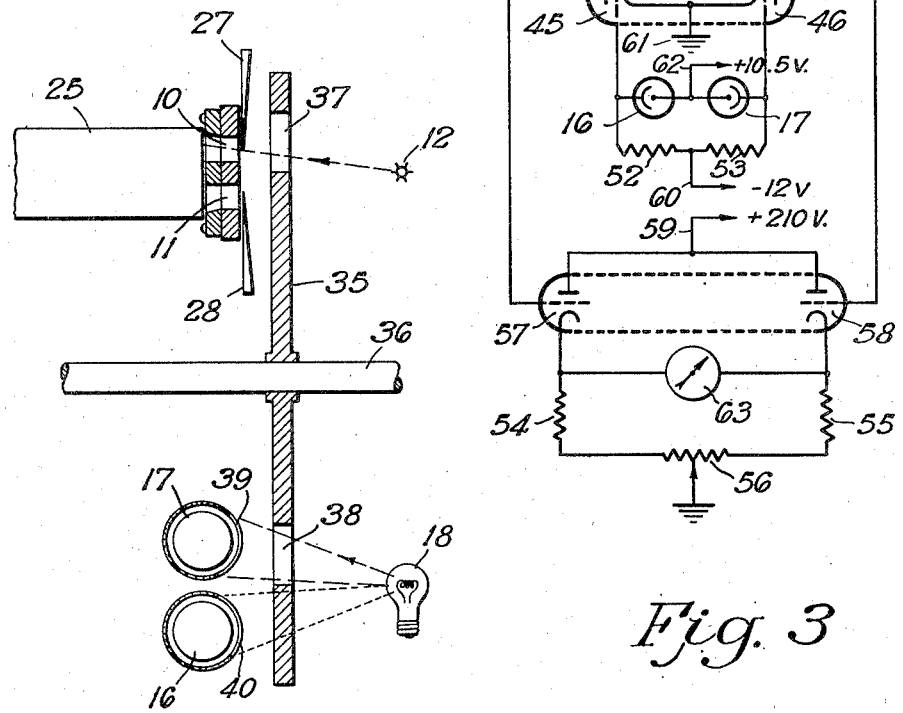

INVENTORS:
Robert B. Jacobs
Evon C. Greanias
BY Everett A. Johnson
ATTORNEY

United States Patent Office 2,817,764
Patented Dec. 24, 1957

2,817,764

BETA RAY HYDROGEN DENSITY INDICATOR

Robert B. Jacobs, Homewood, Ill., and Evon C. Greanias, Vestal, N. Y., assignors to Standard Oil Company, Chicago, Ill., a corporation of Indiana Application April 29, 1955, Serial No. 505,007

7 Claims. (Cl. 250—43.5)

This invention relates to a method and apparatus of the comparison type for determining hydrogen in a substance without destructive chemical analysis thereof. It pertains more specifically to an apparatus employing a beta ray source for determining and indicating the hydrogen density in solids, liquids or gases.

It is frequently desirable to ascertain accurately the hydrogen density in compounds or mixtures which heretofore could be determined only by time-consuming operations involving chemical analysis. For example, it is well known that the carbon-hydrogen ratio of hydrocarbons is a basic and important property. The degree of hydrogen saturation or density of different components of gasoline affects their knocking properties and the burning quality of a heater oil is directly related to its carbon-hydrogen ratio. Thus, there is a close connection between the carbon-hydrogen ratio of a petroleum product and its commercial utility. However, the measurement of the carbon-hydrogen ratio is so difficult that it is seldom used in commercial practice.

It is, therefore, a primary object of the invention to provide a method and apparatus which will give an accurate quantitative indication of hydrogen density without the necessity of any physical separation or chemical reaction. A further object of our invention is to provide a system for determining carbon-hydrogen ratios of hydrocarbons by physical means. An additional object is to provide such a system which is adaptable for routine control determination of hydrogen in homogeneous substances. Still another object of our invention is to provide a comparison-type instrument which is simple and foolproof in operation. These and other objects of the invention will become apparent as the description thereof proceeds.

Briefly, the invention comprises placing an unknown specimen and a standard sample in two identical sample cells. The cells are irradiated alternately by a beta ray source which is aligned symmetrically with respect to both cells. A single radiation detector is arranged to receive beta radiations alternately through the two cells and the amount of radiation to a cell containing the unknown specimen is adjusted so that the beta radiations entering the receiving device are of equal intensity. By carefully adjusting the position of a wedge with a micrometer screw, the radiation entering the detector during alternate exposure periods can be made equal. The degree of adjustment necessary indicates the sum of $\rho + \rho_H$ for the unknown specimen relative to the reference sample.

The values of the sum of $\rho + \rho_H$ for the reference sample and the corresponding micrometer position are plotted. To obtain $\rho_H$, the density of hydrogen atoms in grams per cc. of the unknown specimen, the micrometer reading is applied to the curve of the reference sample and the value of $\rho + \rho_H$ determined graphically therefrom. To obtain $\rho_H$ it is merely necessary to subtract the measured density $\rho$ for the unknown specimen from the graphically determined value of $\rho + \rho_H$. The carbon-to-hydrogen ratio can then be calculated from the measured and determined values of $\rho + \rho_H$, i. e. $\rho/(\rho - \rho_H)$. Or the hydrogen percentage can be calculated, i. e. $\rho_H/\rho \times 100$.

Further details of the invention will be described in connection with the attached drawings which form a part thereof, and wherein:

Figure 2 is a modified embodiment of a shutter arrangement for use in the apparatus of Figure 1;

Figure 3 is a wiring diagram of a preferred control and measuring circuit;

Figure 8 is a schematic plan view of a modified cell construction employing a solid reference standard; and Figure 9 is a schematic plan view of still another embodiment of reference standard and wedge construction.

Figure 1:
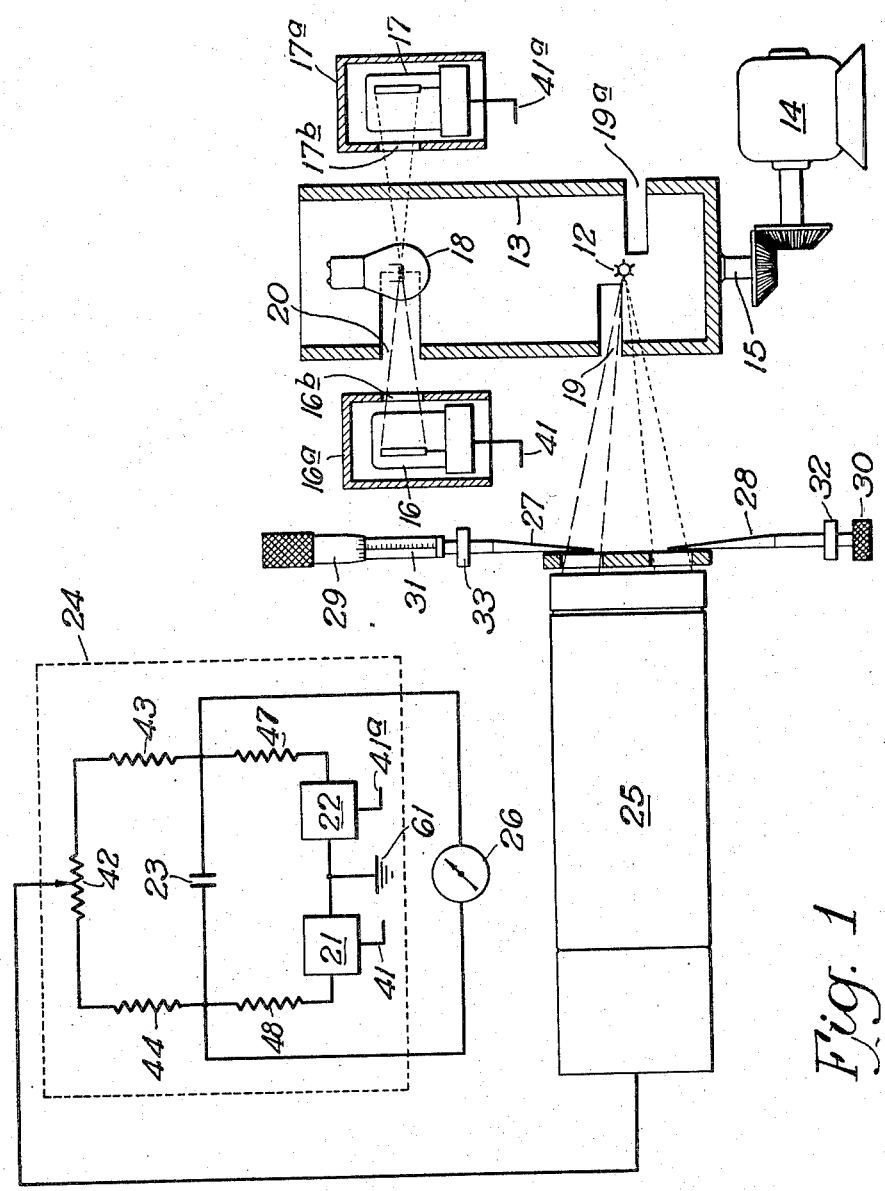
Figure 1 is a schematic diagram of one form of the apparatus.

The complete experimental procedure comprises the measuring of the specific gravity of the sample; aligning the components of the instrument to initially balance it; filling the standard cell with a suitable reference material and filling the sample cell with the unknown which results in an unbalance; adjusting the micrometer-controlled wedge to again balance the instrument; applying the micrometer scale reading to the plot of the reference material; and graphically determining the value of $\rho + \rho_H$ and obtaining $\rho_H$ by subtracting the measured specific gravity $\rho$ from the graphically determined sum of $\rho + \rho_H$. It is only necessary to align the instrument and fill the standard cell once for each set of determinations.

By this instrument, we are enabled to obtain the hydrogen density of the sample, i. e. the density of hydrogen atoms by weight in the volume of the sample. This value can be obtained independent of the other components of the sample. To obtain $\rho_H$, i. e. the density of hydrogen atoms in grams per cc., it is necessary to obtain the density $\rho$ for the unknown specimen by conventional physical means and to subtract the so determined density $\rho$ from the sum of $\rho + \rho_H$ as determined from the curve.

In the drawing, we have illustrated comparison-type instruments employing beta rays for the indication of hydrogen density. For this purpose two identical cells 10 and 11, one for the unknown specimen and the other for a standard reference sample, are provided. A beta ray source 12, aligned symmetrically with respect to both cells 10 and 11, is enclosed by a rotatable shutter 13. The shutter 13 is fixed to a shaft 15 driven by a suitable motor 14. As it is rotated the cells 10 and 11 are alternately irradiated by the beta ray source 12.

The shutter 13 also controls the illumination of the phototubes 16 and 17 by the lamp 18 through the shutter 13. In Figure 1, three openings 19, 19a and 20, are provided in the cylindrical shutter 13. The action of the shutter is synchronized to make phototube 16 conduct when the unknown specimen cell 10 is being irradiated, and phototube 17 conduct when the standard sample cell 11 is being irradiated.

The conduction of the respective phototube 16 or 17 actuates switch means 21 or 22 and determines the polarity of the charge applied to a condenser 23 in the measuring circuit 24. This condenser 23 is charged by pulses of current from the Geiger tube 25, arranged to be irradiated alternately by unabsorbed beta rays passing through the unknown specimen cell 10 and the standard sample cell 11. A null indicator 26, which may for example be a galvanometer driven by cathode followers, measures the average charge on the condenser 23.

If the beta radiations entering the Geiger tube 25 during the alternate shutter periods are of equal intensity, the condenser 23 receives equal current pulses of opposite polarity and maintains zero average charge. On the other hand, if the unknown specimen in cell 10 transmits more beta rays than the standard in cell 11, the condenser 23 acquired a net electrical charge. This charge is a function of the relative proportions of hydrogen in the specimen and standard.

Instead of measuring this charge differential, we prefer to control the relative extent of radiation of the standard and of the specimen to obtain a zero or null charge. For this purpose a wedge 27 is moved into the path of the beta rays from the source 12 entering the cell 10 with the unknown sample to reduce the number of rays which traverse the cell. By carefully adjusting the position of the wedge 27 with a micrometer screw 29, the radiation entering the Geiger counter 25 during alternate shutter periods can be made equal. When balance is attained as indicated by the null meter 26, the reading on the calibrated scale 31 indicates the sum of $\rho + \rho_H$ for the unknown sample relative to the standard sample.

Figure 7:
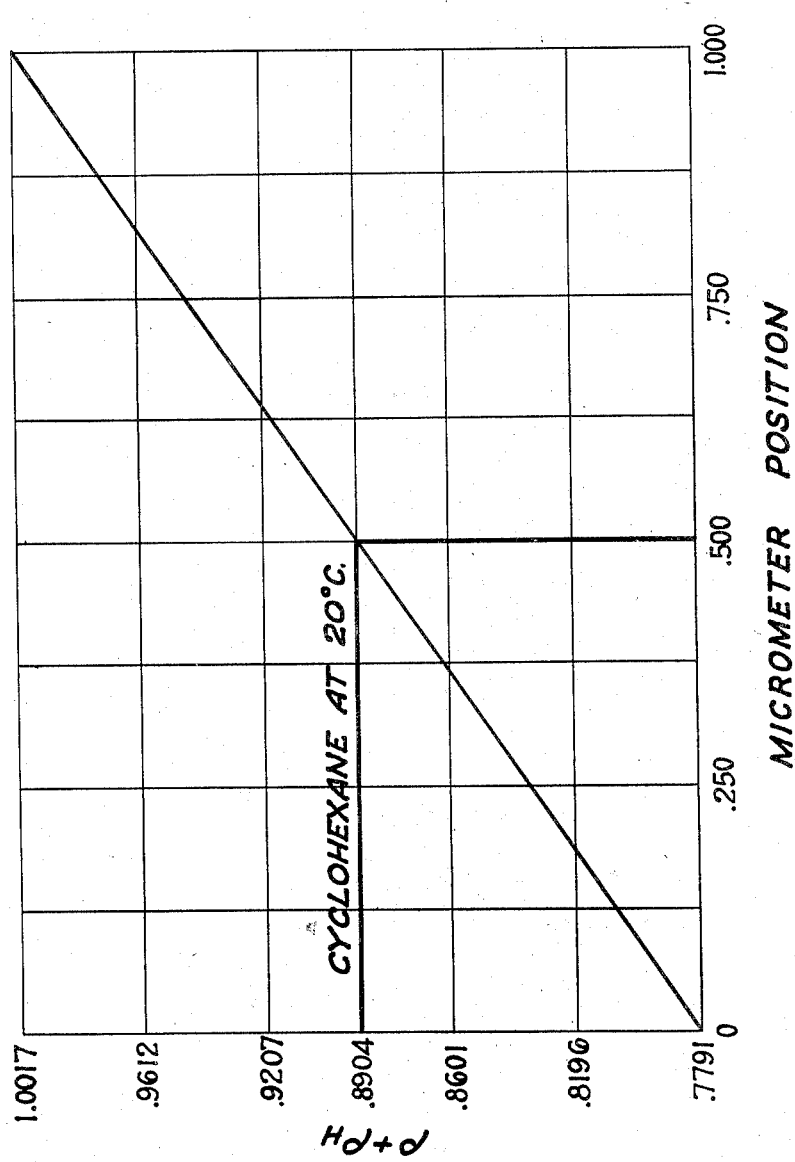
Figure 7 is a plot of micrometer position against the sum of $\rho + \rho_H$ for cyclohexane as a standard.

The relationship between the reading of the micrometer scale 31 and the sum of $\rho + \rho_H$ for a particular wedge 27 with pure cyclohexane as the standard in cell 11 is shown in Figure 7. The reading of the micrometer 31 is applied to the curve to obtain graphically the sum of $\rho + \rho_H$ for the unknown specimen. To obtain $\rho_H$, i. e. the density of hydrogen atoms in grams/cc., it is merely necessary to obtain the density $\rho$ for the unknown specimen by conventional physical means and to subtract the so determined density $\rho$ from the sum of $\rho + \rho_H$ as determined from the curve.

A second screw 30 and wedge 28 can be associated with the standard cell 11 for setting the calibration of the device. Thus, the standard sample can be placed in both cells 10 and 11 and with the operating micrometer 29 at the position corresponding to the standard sample, the system can be balanced by adjustment of the second wedge. The unknown specimen cell 10 can then be emptied and refilled with the unknown specimen and the operating wedge 27 and micrometer 29 readjusted to obtain a second null reading on meter 26. The final position of the wedge 27 as indicated by the micrometer 29 is then an indication of the relative proportion of hydrogen in the unknown specimen. When the instrument is in proper alignment and the standard cell 11 is filled with a suitable reference material, the following test procedure may be used:

(1) Fill the sample cell 10 with the unknown specimen.

(2) With the micrometer screw 29 adjust the wedge 27 to give zero deflection on the null indicator 26.

(3) After this final adjustment and following a waiting period of about 1.5 minutes during which the cylindrical shutter is continuously rotated at a uniform rate, observe the position of micrometer 29 and any unbalance of the null indicator 26. The micrometer scale reading gives $\rho + \rho_H$ directly from the curve if the null indicator 26 still reads on zero. Any deflection of the null indicator 26 following the test period is added algebraically to the reading of the micrometer 29 as a final correction in the sum of $\rho + \rho_H$.

(4) The corrected micrometer reading is then applied to the curve of Figure 2 and the sum of $\rho + \rho_H$ for the unknown sample is obtained graphically.

(5) Obtain $\rho_H$ and measure the specific gravity $\rho$ of the unknown accurately and subtract from the graphically determined value of $\rho + \rho_H$.

The determination of $\rho$ and the radiation of the unknown specimen and the standard sample should be at the same temperature level.

The useful energy range of the beta radiation for hydrogen density measurement is determined by practical limits on the cell size and source availability. A minimum source energy would be approximately 0.5 m. e. v. and this minimum is determined by the cell size. It may, however, be desirable to have a source emitting beta rays with energy as high as approximately 5.0 m. e. v. Thus, the useful range of radiation energy for the beta ray source 12 may be between about 0.5 m. e. v. and 5.0 m. e. v., a source 12 of strontium 90 having a beta radiation energy of about 2.2 m. e. v. having been demonstrated as very satisfactory for our purposes with a sample cell of approximately 0.3 in length. The counting device or radiation detector 25 may comprise a Nuclear Instrument Corporation Model D33 Geiger counter or its equivalent.

In Figure 2, we have illustrated another modification of the shutter. In this figure the shutter comprises a scanning disc 35 mounted for rotation with shaft 36. The disc has an annular semicircular slit 37 which is alternately in register with the cell 10 and the corresponding phototube 16. A second semicircular and annular slit 38 of smaller radius is likewise alternately in register with cell 11 and phototube 17. Corresponding elements in Figure 2 and Figure 1, in general, function as described in connection with Figure 1. However, the phototubes 16 and 17 in Figure 2 are provided with light slits 39 and 40, radial to the shaft 36 of the shutter 35 whereas the corresponding phototubes in Figure 1 have slits 16b and 17b which are parallel to the axis of rotation of the cylindrical shutter 13.

Referring to Figure 3, we have illustrated one form of electrical circuit adapted to indicate the quantity of electrical energy resulting from the beta radiation received by the Geiger Mueller tube 25 and this circuit may be used in the various modifications of our apparatus. As described above, the conduction of the respective phototube 16 or 17 determines the polarity of the charge applied to the condenser 23 in the measuring circuit 24. This condenser 23 is charged by pulses of current from the Geiger tube 25 which is arranged to be irradiated alternately by unabsorbed beta rays passing through the unknown specimen cell 10 and the standard sample cell 11. The charge is introduced into the measuring circuit 23 by means of adjustable resistor 42 and, depending upon the conduction of the particular phototube 16 or 17, the current passes through fixed resistor 43 or 44 to the condenser 23. The vacuum tubes 45 and 46 operate as switches (21 and 22 of Figure 1) which are actuated when the corresponding photocells 16 and 17 conduct through resistors 52 and 53 and raise the grid to zero potential. The vacuum tubes 45 and 46 may, for example, each be one-half of a type 5691 tube. The resistors 43, 44, 47, 48, 52 and 53 are equal and all may be about 10 megohms. The condenser 23 may be one microfarad. In parallel with condenser 23 we may include a second condenser 49, having a value of three microfarads, and switch 50 to select the total capacity in use at any one time. This makes it possible to obtain a short response time (appoximately 20 seconds) for rapid rough adjustment of the wedge position, and a long response time for a small statistical error in the final balance.

A null indicator 26 which may, for example, be a galvanometer 63 driven by cathode followers, measures the average charge on the condenser 23. If the beta radiations entering the Geiger tube 25 during the alternate shutter periods are of equal intensity, the condenser 23 receives equal current pulses of opposite polarity and maintains a zero average charge as measured by the null indicator 25. To complete the null indicator circuit we provide fixed resistances 54 and 55 of 40K, variable resistance 56 of 5K, and two vacuum tubes 57 and 58, e. g. type 5692, connected as shown. A power supply of 210 volt D. C. can be applied to the null indicator circuit at 59. The phototube switch circuit bias potentials are supplied to the vacuum tubes by a 12 volt battery applied negatively with respect to ground 61 to lead 60, and a 10.5 volt battery applied positively with respect to ground to lead 62.

To adjust the measuring circuit and null indicator initially, variable resistance 56 is first adjusted to bring the galvanometer 63 to zero with the cathode follower grids of tubes 57 and 58 shorted together by means of switch 51. Then with switch 51 open, and the standard sample in both cells, resistor 42 is adjusted to bring the galvanometer to zero. Frequent adjustment of this circuit is not necessary.

Figure 4:
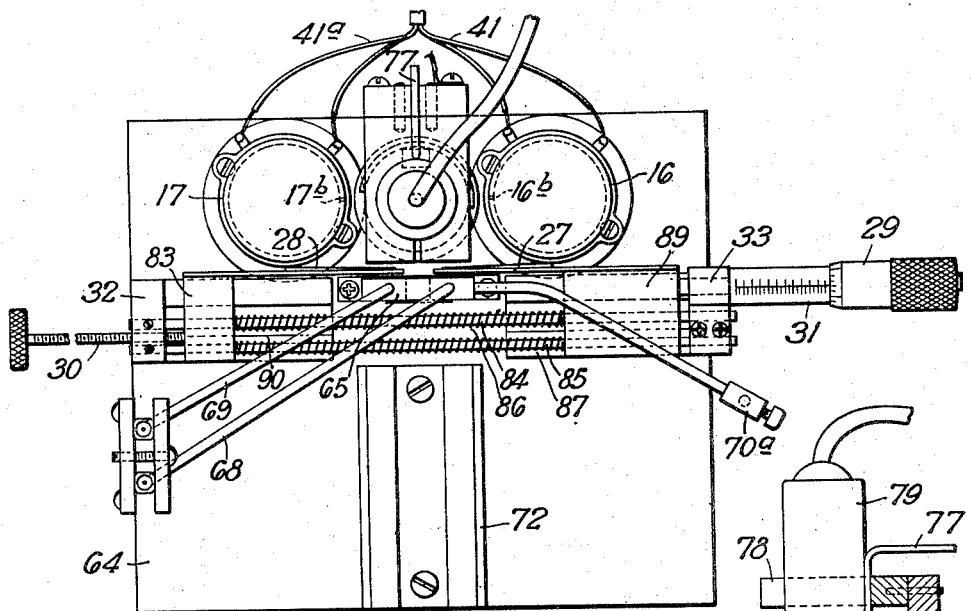
Figures 4 and 5 are plan and elevation views of one apparatus.
Figures 5, 6:
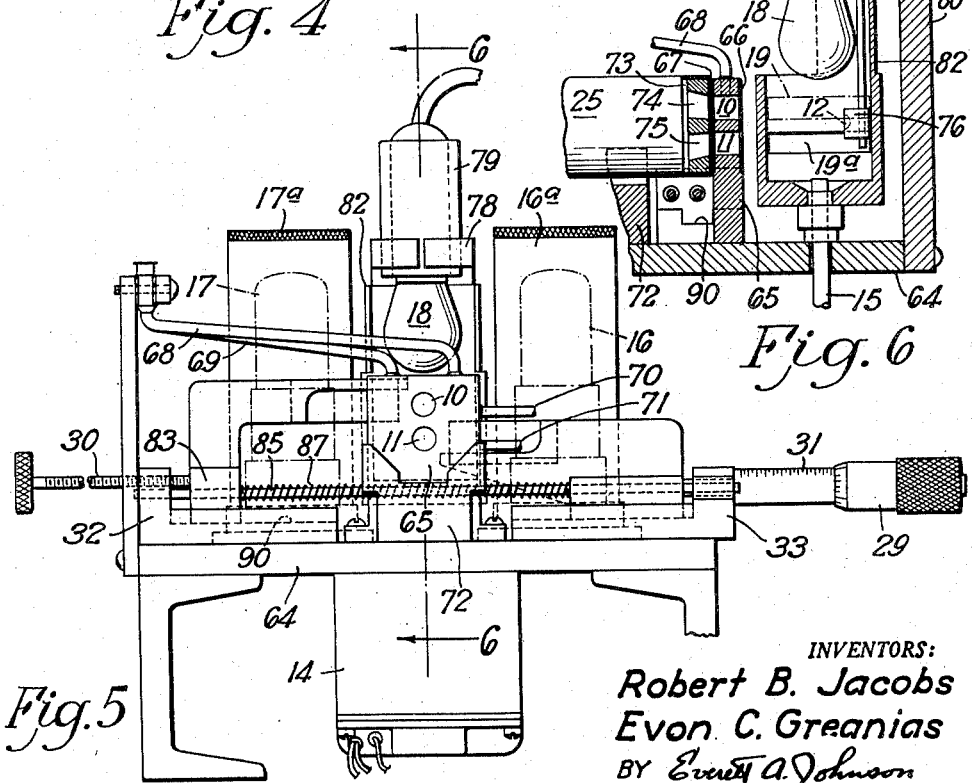
Figure 6 is a fragmentary section taken along the line 6—6 of Figure 4.

In Figures 4, 5 and 6, we have illustrated in greater detail elements of the device diagrammatically shown in Figure 1. A base plate 64 serves as a frame for the apparatus and supports the motor 14 which drives the shutter 13 through shaft 15. A pair of cells 10 and 11 is mounted on holder 65. These cells comprise bores in a brass plate with cell windows 66 and 67 cemented to opposite faces. Separate conduits 68 and 69 are provided for filling the respective cells. Drain ducts 70 and 71 with terminal valves 70a and 71a permit the removal of the sample from both of the cells 10 and 11. A cradle 72 supports the radiation detector 25 which may be a Geiger Mueller tube, in alignment with the cells 10 and 11. A lead shield 73 about 0.25 inch thick having dual channels 74 and 75 is interposed the detector 25 and the cells 10 and 11. This lead shield serves to eliminate from the detector field the bulk of the secondary gamma radiation so that beta rays are predominantly those which affect the detector. The beta ray source 12 such as a capsule 76 containing strontium 90 is adjustably supported on depending rod 77 passing through the arm 78 of the gibbet-like support 79. Also supported from the arm 78 is a light source including a lamp 18 and a removable socket 79 which is slidably held within a split bore in the arm 78. The cylindrical shutter 13 includes an upper phototube control section which comprises a semicylindrical shutter 82 with the balance of the cylinder cut away to provide light gate 20. Two beam openings 19 and 19a are alternately in register with cells 10 and 11 as the cylindrical shutter 13 is rotated by the motor 14. Obviously, as the cylindrical shutter rotates, the beam of radiation from the source 12 is directed through slit 19 or 19a through the cell 10 or 11 and onto the detector 25. Similarly, the corresponding phototubes 16 or 17 is energized by the lamp 18 as the semicylindrical aperture 20 is directed toward the designated phototube. Each of the phototubes is provided with a cylindrical light shield 16a and 17a having light slits 16b and 17b which are parallel to the axis of rotation of the cylindrical shutter 13. The leads 41 and 41a from the phototubes 16 and 17 are connected to the measuring circuit 24 and actuate the corresponding switch 21 or 22. These switches may be of a mechanical or solenoid type but are preferably segments of vacuum tubes as described in connection with the circuit shown in Figure 3.

The intensity of the radiation directed toward each cell is adjustable by means of wedges 27 and 28. Wedge 28 is fixed to carrier 83 and its position is determined by turning thumb screw 30 which is threaded within stationary block 32. The coil springs 84 and 85 on rods 86 and 87 remain in compression and urge the traveling block 83 outwardly in contact with the thumb screw 30. By providing adjustable wedge 28, the range of the instrument and the range of standards which may be used are extended.

The measuring or operating wedge 27 is carried by traveling block 89 which rides along track 90 and the wedge 27 is urged outwardly by the coil springs 84 and 85. A micrometer 29 is mounted in fixed block 32 and determines the relative position of the wedge 27. As described with Figure 1, when the wedge 27 is in position where a null reading is obtained on the null indicator 26 in the measuring circuit 24, the scale 31 on the micrometer screw 29 is read and applied to the curve shown in Figure 7.

Figure 7 contains a typical calibration curve for cyclohexane as the standard at 20° C. This particular calibration is for use with a Duralumin wedge tapered from 0.008 inch to 0.032 inch over 1 inch of length. The calibration of this figure is determined by placing cyclohexane on the midpoint of the scale 31 of the 1-inch micrometer 29. To achieve such calibration, it is necessary to first place cyclohexane in both cells 10 and 11; second, adjust the micrometer 29 on mid-scale; and third, adjust the auxiliary wedge 28 by screw 30 for a null reading on the null indicator 63. When other standards are used with this wedge system, the range of $\rho + \rho_H$ indicated in Figure 7 will remain the same but will be centered about the $\rho + \rho_H$ value for the particular standard.

The cells 10 and 11 have been shown in the described apparatus as comprising bores in holder 65 with windows 66 and 67. It is also contemplated that the standard cell 11 may comprise a removable unitary windowed cell which may be interchanged for recalibration of the device for use in different classes of unknowns. Likewise, there may be a continuous flow of unknown through the sample cell 10, such unknown being supplied as an increment of a flowing stream of much larger volume and used for monitoring hydrogen density of a plant stream.

In place of the reference liquid in reference cell 10, we may, as shown in Figure 8, provide a standard absorber 101 which, for example, may be made of Invar. The thickness of the absorber 101 is determined by the high end of the electron density range to be covered, but an absorber of 0.027 inch thickness will include most liquid hydrocarbons when used with a cell 10 of 0.270 inch in length and a movable wedge 27.

The movable wedge 27 can be of any absorbing material, such as aluminum, Duralumin, Invar or plastic, so long as it is ultimately calibrated with known hydrocarbons. A Duralumin wedge 27 which tapers from 0.001 inch to 0.25 inch and of about 2.625 inches in length covers a reasonable range of hydrocarbons when used with a 0.270 inch cell 10.

The wedge 27 may be combined with the absorber 101 as shown in Figure 9, in which event the taper of the wedge 103 is from about 0.028 inch to 0.277 inch over a length of about 2.625 inches. Even when using a combined wedge-absorber 103, we may provide the full reference cell 10 in the system since it permits the calibration of the apparatus by placing a standard sample in both cells 10 and 11 and manipulating the respective wedges as described above.

We have described our process as including the determination of the specific gravity or density of the unknown sample, but it is intended that equivalent functional specific gravity values are to be included and that any value that is concomitant with specific gravity, such as molecular weight, may be correlated with the radiation absorption characteristic of the sample.

From the above it will be seen that we have attained the objects of our invention and have provided an apparatus which may be used in a system for determining or indicating the hydrogen density with reference to a standard sample of known specific gravity and composition.

This application is a continuation-in-part of our copending application filed April 27, 1951, as Serial Number 223,392, now forfeited.

Although we have described the invention in terms of specific examples and operations which have been set forth in some detail, it is to be understood that these are by way of illustration only and that the invention is not limited thereto. Alternative embodiments and variations in operating techniques will become apparent to those skilled in the art in view of the disclosure. Accordingly, modifications of the invention are contemplated without departing from the spirit of the described method and apparatus or from the scope of the appended claims.

What we claim is:

1. An apparatus for quantitatively determining the hydrogen content of hydrocarbon substances of determined density which comprises a beta ray source, a first double windowed cell adapted to confine a hydrocarbon sample, a second double windowed cell similar to said first cell and adapted to confine a reference material, said first and second cells being arranged in substantially the same plane, a rotatable shutter means adapted to expose alternately said first cell and said second cell to radiations from said beta ray source, a single detector means for measuring unabsorbed radiation from said source alternately passed through said cells, a meter means measuring the differential of said unabsorbed radiation, and a wedge means interposed said detector and said beta ray source adapted to intercept a portion of the radiation emanating from said beta ray source.

2. In combination, an apparatus adapted to indicate the relative proportion of hydrogen in a reference sample and a test sample which comprises a source of beta radiation, a radiation detector spaced from said source, a shielding shutter comprising an inverted cylinder having non-aligned apertures, a reference cell and a sample cell interposed said shutter and said detector, a light source within said shutter, a light slit in a lower part of said shutter, a pair of phototubes on opposite sides of said shutter, means for rotating said shutter at a uniform constant speed, a measuring circuit adapted to convert the output of said detector into an electrical quantity, said phototubes being connected in circuit to control the reversal of polarity of said detector output, a null indicator in said measuring circuit, a micrometer-controlled wedge adapted to restrict the hard radiations directed by said shutter to said first cell, and a micrometer scale associated with said wedge for indicating the relative proportion of blocking of said beam which is necessary to maintain the measuring circuit in a null condition.

3. An apparatus for indicating hydrogen density by physical analysis of substances which includes a radiation source, a single radiation detector spaced from said source, a sample cell and a reference cell interposed said source and said detector, said cells being arranged adjacent each other in substantially the same plane, a slotted and rotatable cylindrical shutter means interposed said cells and said source, a light source within said shutter means, a pair of phototubes spaced on opposite sides of said rotatable shutter means, a light gate in said shutter means registerable with said light source and said phototubes to alternately illuminate one of said phototubes, null meter means for the output of said detector, said phototubes being in circuit with said meter means and adapted to indicate which of said cells is exposed to said source at a given point in the rotation of said shutter means, a wedge means interposed one of said cells and said source, said wedge means extending into the beam from said source to said single detector, and micrometer means for indicating the relative position of said wedge.

4. The apparatus of claim 1 wherein said reference material comprises a liquid.

5. The apparatus of claim 1 which includes a reference material comprising a calibrated solid absorber.

6. The apparatus for indicating hydrogen content by physical analysis of substances which includes a radiation source, a single radiation detector spaced from said source, a sample cell and reference means interposed said source and said detector, said sample cell and reference means being arranged adjacent each other in substantially the same plane, a rotatable shutter means adapted to expose alternately said sample cell and said reference means to radiations from said source, said detector measuring unabsorbed radiation from said source alternately passed through said sample cell and said reference means, meter means measuring the differential of said unabsorbed radiation, and wedge means interposed said detector and said radiation source adapted to intercept a portion of the radiations emanating from said source, said reference means comprising a calibrated solid absorber movable with said wedge means.

7. The apparatus of claim 6 wherein said reference means also includes a reference cell.

References Cited in the file of this patent
UNITED STATES PATENTS

| | | |
|---|---|---|
| 2,097,760 | Failla | Nov. 2, 1937 |
| 2,467,812 | Clapp | Apr. 19, 1949 |
| 2,517,554 | Frommer | Aug. 8, 1950 |
| 2,534,352 | Herzog | Dec. 19, 1950 |
| 2,547,212 | Jamison | Apr. 3, 1951 |
| 2,709,943 | Frommer | June 7, 1955 |

FOREIGN PATENTS

| | | |
|---|---|---|
| 567,280 | Great Britain | Feb. 7, 1945 |

OTHER REFERENCES

"Beta-Ray Thickness Gage for Sheet Steel" by Smith, Electronics, October 1947, pp. 106–112.